UNITED STATES PATENT OFFICE.

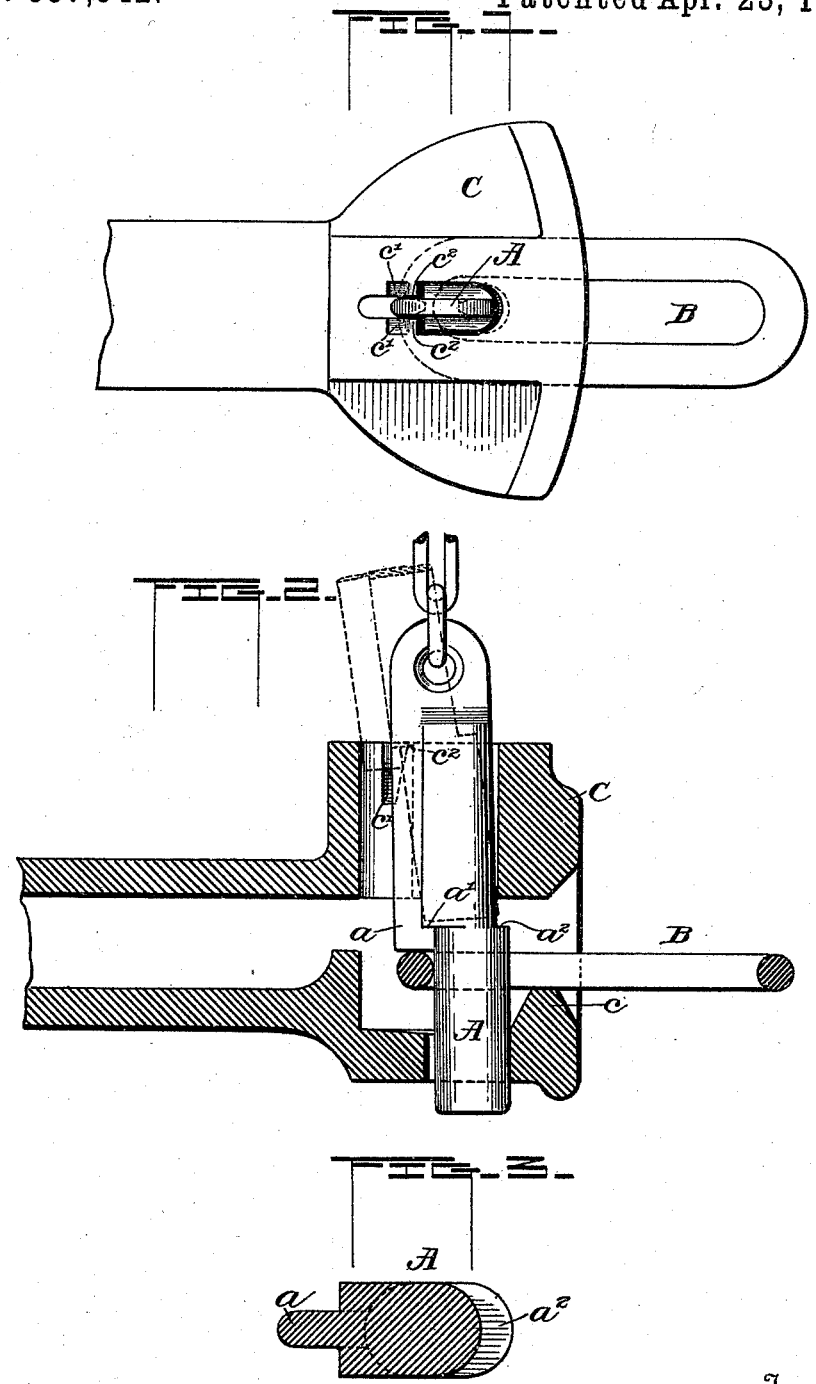

SAMUEL SELDEN, OF ASPEN, COLORADO.

CAR-COUPLING.

SPECIFICATION forming part of Letters Patent No. 537,942, dated April 23, 1895.

Application filed May 8, 1894. Serial No. 510,541. (No model.)

*To all whom it may concern:*

Be it known that I, SAMUEL SELDEN, a citizen of the United States, residing at Aspen, in the county of Pitkin and State of Colorado, have invented certain new and useful Improvements in Railway-Car Coupling-Pins; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention is an improvement upon the one for which I filed an application February 28, 1894, Serial No. 501,811.

The object of my invention is to provide a coupling pin, in couplers where the pin bears or presses on the link in the link-chamber, that cannot be thrown out of the pin hole by the motions of the link.

Figure 1 is a top plan view of a drawhead equipped with my coupling pin. Fig. 2 is a vertical longitudinal section of the same; and Fig. 3 is a cross section of the pin on line 3—3, Fig. 2, drawn on an enlarged scale.

The coupling pin A is very similar to the one shown in my prior application, above referred to. It has a flange or rib $a$ along the upper portion of its rear edge. This rib rests upon the link B, and holds it in position for coupling, the drawhead C having a lip $c$ at the bottom of its mouth, to support the link. The pin A is also provided on each side with a shoulder $a'$, which terminates just above the lower end of the rib $a$; and on its front face with a shoulder $a^2$.

The pin hole in the drawhead is similar in shape to the cross section of the pin, but larger, so that the pin can have a certain amount of play. In the top of the drawhead, on each side of the groove which receives and guides the rib $a$ is a notch $c'$, whose bottom runs down and inwardly into the groove. Between each notch $c'$ and the larger portion of the pin hole is a rounded shoulder $c^2$.

The pin is raised by the usual operating lever, from either the side or the top of the car, and in so raising it, its head is naturally pulled backward, so that as soon as the shoulders $a'$ emerge from the pin hole they are drawn back and drop into the notches $c'$, being supported on the shoulders $c^2$. The lower portion of the rib $a$ still remains in the groove, ready to guide the pin when it is thrown forward off the shoulders $c^2$ by the shock of the meeting cars. The notches hold the pin firmly against slight shocks. Their inclined bottoms prevent any lodgement in them of dirt or cinders.

Any coupling pin that bears or rides on the link when in service on the road may be tossed out of the pin hole by the movements of the link, and in order to prevent this, I provide the pin with the shoulder $a^2$, which will catch or take a hold against the roof or upper side of the link chamber and thus prevent the ejectment of the link. The position of this shoulder $a^2$ must be so chosen, that the link may have all the necessary range of vertical movement required in service. This space is also necessary to enable the shoulder to clear the drawhead and enter the pin hole when the pin is lifted, the play of the pin in the hole allowing it to be inclined backward sufficiently to accomplish this.

Having thus described my invention, what I claim is—

1. The combination with a coupling pin having the rib $a$ on its rear, the shoulders $a'$ on its sides, and the shoulder $a^2$ on its front, of a drawhead having a pin hole conforming to the shape of the pin and having its upper surface formed to receive the shoulders $a'$, substantially as described.

2. The combination with a coupling pin having the rib $a$ and the shoulders $a'$ terminating just above the lower end of the rib, of the drawhead having the groove for the rib, and the notches $c'$ on each side of the same to receive the shoulders $a'$, substantially as described.

In testimony whereof I affix my signature in the presence of two witnesses.

SAMUEL SELDEN.

Witnesses:
D. ROHLFING,
H. L. MCNAIR.